(12) United States Patent
Braunstein et al.

(10) Patent No.: US 11,489,920 B2
(45) Date of Patent: *Nov. 1, 2022

(54) BREAD CRUMB DIRECTORY WITH DATA MIGRATION

(71) Applicant: Spectra Logic Corporation, Boulder, CO (US)

(72) Inventors: Jeffrey Leon Braunstein, Windsor, CA (US); David Lee Trachy, Longmont, CO (US); John Walter Kranz, Erie, CO (US); Kumar Goswami, Saratoga, CA (US); Krishna Subramanian, Saratoga, CA (US); Mohit Dhawan, San Carlos, CA (US); Michael Peercy, Los Altos, CA (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,111

(22) Filed: Mar. 23, 2021

(65) Prior Publication Data

US 2022/0311823 A1   Sep. 29, 2022

(51) Int. Cl.
*H04L 67/1097* (2022.01)
*H04L 67/02* (2022.01)
*G06F 11/14* (2006.01)
*G06F 16/23* (2019.01)

(52) U.S. Cl.
CPC ...... *H04L 67/1097* (2013.01); *G06F 11/1451* (2013.01); *G06F 16/2379* (2019.01); *H04L 67/02* (2013.01); *G06F 2201/80* (2013.01)

(58) Field of Classification Search
CPC .. H04L 67/1097; H04L 67/02; G06F 11/1451; G06F 16/2379; G06F 2201/80
USPC .......................................................... 709/219
See application file for complete search history.

(56) References Cited

U.S. PATENT DOCUMENTS

| | | | |
|---|---|---|---|
| 9,235,356 B2 * | 1/2016 | Backa | G06F 3/0604 |
| 2002/0161784 A1 | 10/2002 | Tarenskeen | |
| 2011/0035409 A1 | 2/2011 | Shimada et al. | |
| 2014/0082479 A1 * | 3/2014 | Guinane | G06F 40/143 |
| | | | 715/234 |
| 2018/0069865 A1 * | 3/2018 | Rieke | H04L 43/045 |

* cited by examiner

*Primary Examiner* — Sibte H Bukhari
(74) *Attorney, Agent, or Firm* — Kenneth Altshuler

(57) ABSTRACT

In certain instances, a data management application (software application) that manages moving data files, and the like, from a primary high-speed storage system. An end-user can configure the data management application for particular files via management policies. Based on the management policies, after a file is migrated from the primary storage system to a targeted secondary storage system, a breadcrumb pointing to a webpage for the migrated file is left behind in the primary storage system. The webpage can be used to manage the migrated file, such as moving the migrated file back to the primary storage system.

6 Claims, 13 Drawing Sheets

BREAD CRUMB DIRECTORY WITH DATA MIGRATION

CROSS-REFERENCE TO RELATED APPLICATIONS

This application is a Divisional US Patent Application which claims priority to and the benefit of U.S. patent application Ser. No. 15/790,243 entitled BREAD CRUMB DIRECTORY WITH DATA MIGRATION filed on Oct. 23, 2017.

FIELD OF THE INVENTION

The present embodiments are directed to replacing a directory of locally stored data files with a directory of breadcrumb pointing to a webpage following migration of the data files to an archive storage system within a Network Attached Storage architecture.

DESCRIPTION OF RELATED ART

High-speed storage server systems are heavily utilized by end-users to quickly store and quickly retrieve their data files. High-speed storage server systems come with a penalty. That is, high-speed storage server systems are among the most expensive ways to retain data files because their high data bandwidth. Naturally, over time these data files are accessed with progressively lower frequency until they become outdated and are simply retained in the high-speed storage server systems for purposes of posterity. Rarely to never accessed (outdated) data files retained in high-speed storage server systems is an inefficient and costly way to store data. Accordingly, outdated data files are commonly migrated to archive storage systems that hold outdated data files in the event someone wants to retrieve them some day. When data files are moved from high-speed storage server systems to archive storage systems, a directory pointing directly to files contained in the archive storage system is generated within the high-speed storage server system.

It is to innovations related to this subject matter that the claimed invention is generally directed.

SUMMARY OF THE INVENTION

The present embodiments are directed to replacing a directory of locally stored data files with breadcrumbs pointing to a webpage following migration of the data files to an archive storage system within a Network Attached Storage architecture.

Certain embodiments of the present invention contemplate a method comprising: storage retrieval method comprising: providing a primary storage system possessing a first data file and a directory listing that the first data file is local on the primary storage system; migrating a copy of the first data file to a first archive location on an archive storage system; creating a webpage, independent from the primary storage system, that links to the first data file; after the archiving step, replacing the directory listing with a breadcrumb file that links to the webpage.

Yet other certain embodiments of the present invention contemplate a storage network comprising: a primary storage system possessing a data directory containing a web link of a first data file that points to a webpage, the first data file previously deleted from the primary storage system; an archive storage system retaining the first data file; and the webpage possessing a first option to restore the first data file to the primary storage system, the webpage adapted to facilitate the first option to restore the first data file to the primary storage system when instructed to do so by an end-user.

While other certain embodiments of the present invention contemplate a method comprising: providing a primary storage system possessing a first data file and record of the first data file in a primary storage system directory; constructing migration policies for the first data file in the primary storage system, the migration policies residing in an SCMS (PSCS) database that is located independently from the primary storage system; based on the migration policies, scanning the primary storage system directory via the SCMS and making a log entry of the record in the SCMS database; based on the migration policies, determining that it is time to migrate the first data file; the SCMS transmitting a request to migrate the first data file from the primary storage system to an archive storage system via a data mover; the data mover pulling a copy of the first data file from the primary storage system and transmitting the copy of the first data file to the archive storage system; deleting the first data file from the primary storage system; replacing the record of the first data file with a breadcrumb file pointing to a webpage maintained by the SCMS, the webpage manages all archived copies of the first data file.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of pointing to data file directories by way of breadcrumbs. In what follows, similar or identical structures may be identified using identical callouts.

Certain embodiments of the present envision a data management application (software application) that manages moving data files, and the like, from a primary high-speed storage system. An end-user can configure the data management application for particular files via management policies. Based on the management policies, after a file is migrated from the primary storage system to a targeted secondary storage system, a breadcrumb pointing to a webpage for the migrated file is left behind in the primary storage system. The webpage can be used to manage the migrated file, such as moving the migrated file back to the primary storage system. The concept of a breadcrumb to a webpage distinguishes over data directories that directly point to a migrated file, whether by a direct link or a symbolic link, because a webpage allows pulling files (or versions of a file) from back-end storage, such as tape storage, that becomes a problem with a direct link. More specifically, it is difficult for an end-user to directly access a portion of a file stored to back-end storage because it a) takes a long time, and b) it is difficult to access a portion of a file on tape. By transferring the desired file back to the NAS system via a webpage, the file can be accessed quickly whether in part as a whole.

Figure 1:
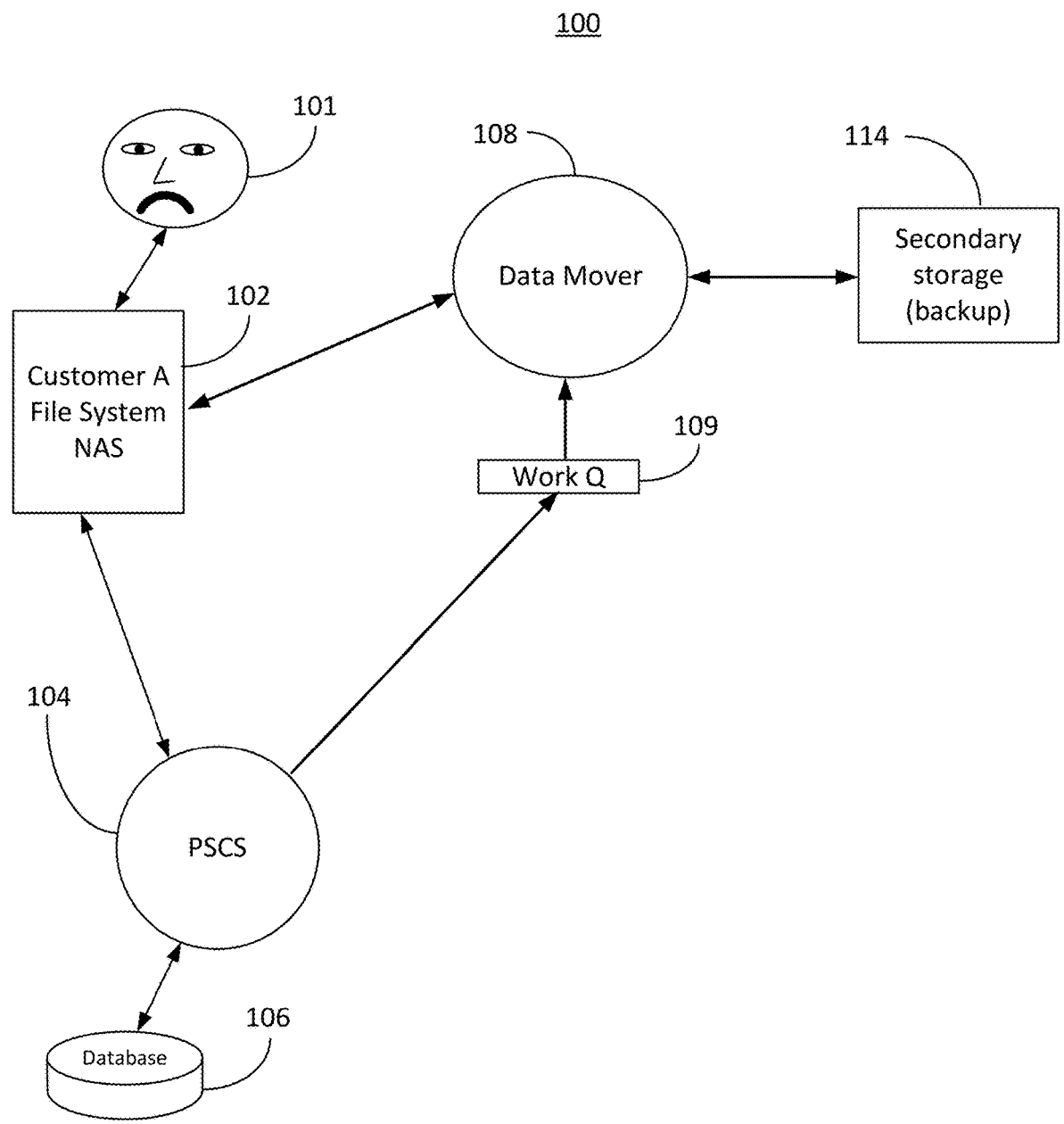
FIG. 1 is a block diagram of a network storage environment wherein some embodiments of the present invention can be practiced.

FIG. 1 is a block diagram of a network storage environment where some embodiments of the present invention can be practiced. As depicted, an end-user 101 is communicatively linked to a primary storage system 102, which in the present embodiment is a NAS file system. The NAS file system 102 (in this embodiment) can comprising an array of high-speed solid-state drives, high-speed disk drives, serially random access devices, or other high-speed storage devices that can quickly store and quickly retrieve data for the end-user 101. High-speed storage is the most expensive kind of storage simply because it relies on high-speed/expensive storage devices. In other words, the end-user 101 pays a premium for storage related performance. High-speed storage devices are ideal for frequently accessed data, which is commonly data that has been recently stored. High-speed storage devices are also commonly used for high-priority data that may or may not be frequently accessed, but needs to be accessed quickly.

The NAS file system 102 is communicatively linked to one or more secondary storage systems 114. Certain embodiments envision archive storage systems to include lower performance hard disk drives, SMR disk drives, tape storage systems, removable disk storage systems (such as compact disk systems), cloud storage, and the like. Archive storage systems are ideal for rarely accessed data because the cost of storage to these systems is less expensive than the primary NAS file system 102 (or equivalent).

Placed between the NAS file system 102 and the secondary storage system 114, is one or more data movers 108. A data mover is a piece of software that translates primary system protocol to the secondary system protocol, and vice versa. Accordingly, in the present embodiment, the NAS protocol, used by the NAS file system 102, is translated to the target archive storage system protocol/format, and vice versa via the data mover. Examples of protocols used for NAS are NSF and CIFS. Though there is a lot of underlying processes to NAS, data mover operating system, OS, takes care of it. Certain embodiments envision data movers operating in an independent computing system that is between the primary storage system 102 and a cohosted with the PSCS, hosted on a separate platform independent of PSCS, cohosted on secondary storage device, or a secondary storage system 114. While, other embodiments envision the data moving software resident in the secondary storage system 114.

Files are characterized in the primary storage system 102 and migrated across the network 100 from the primary data storage system 102 to the secondary storage system 114 by way of a storage characterization and migration software platform, that is commercially named Perpetual Storage Characterization Software, or PSCS, written by Spectra Logic Corporation of Boulder Colo. PSCS 104 resides on a server that is depicted communicatively networked to primary storage 102, the secondary storage 114, the data mover 108, the database 106, the end-user 101 and the work queue. In certain embodiments, PSCS 104 provides a user interface to create storage related policies for data files maintained in the storage devices 102, 114 of the network 100. A database 106 is a reservoir of information about all managed data files in the network 100 accessed by PSCS 104. To better illustrate embodiments of PSCS functionality, FIGS. 2A-6B presents block diagrams and flowcharts depicting data migration between the primary storage system 102 and a secondary storage system 114.

Figure 2A:
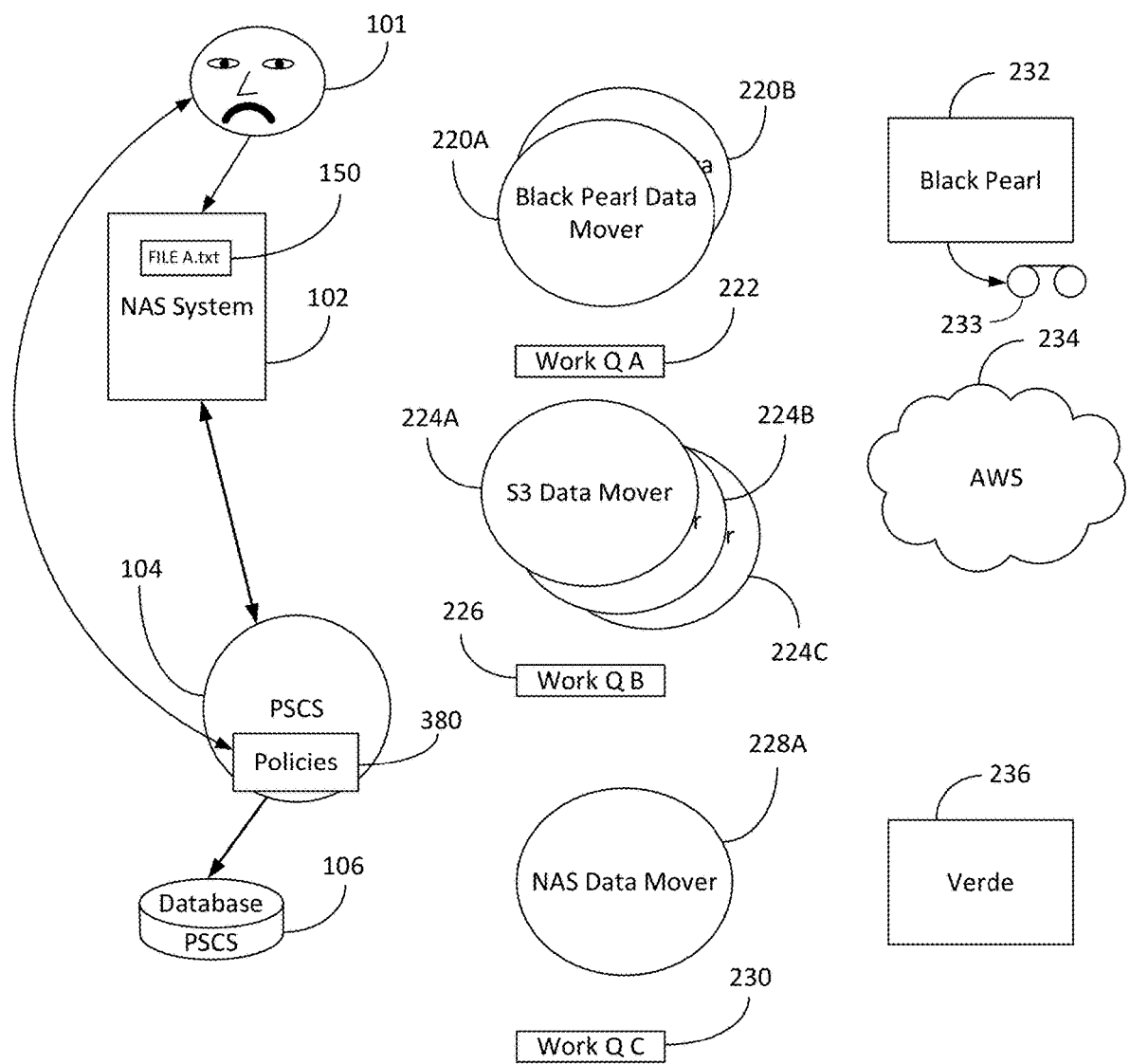
FIG. 2A depicts a block diagram of a network arrangement similar to FIG. 1 with additional secondary storage systems and data movers consistent with embodiments of the present invention.

FIG. 2A depicts a network arrangement similar to FIG. 1 with additional secondary storage systems and data movers consistent with embodiments of the present invention. FIG. 2A is described in view of method steps diagramed in FIG. 2B. Because PSCS 104 controls file migration from NAS system 102 to secondary storage 114, the end-user 101 (or some entity coordinating file migration efforts on behalf of the end-user 101) sets up, creates, migration policies (see FIG. 3) for data files and data objects at PSCS 104, step 352. Subsequently, certain embodiments of PSCS 104 envision a user interface that the end-user 101 can input data policies including migration policies. Some policies can include what files are to be migrated, migration destination, frequency of PSCS 104 scanning the NAS system 102, frequency a file is accessed before migration (e.g., a particular file is not accessed for at least 2 months), time elapsed from when a file is originally stored to NAS system 102 before migration, just to name a few. The end-user 101 can input policies for a particular file, class of files, data object/s, etc., on a graphical user interface displaying one or more policy input fields. The policies are stored in a PSCS database 106, which is or can include dedicated storage to PSCS 104, step 354. Though files can already be present in the NAS system 102 before setting up policies in PSCS 104, the embodiments described assume the PSCS policies are set up prior to storing files to the NAS system 102.

The following example tracks migration activities for File A.txt 150 from NAS system 102 to secondary storage systems 114 and back again governed PSCS 104. In the present example, there are three target commercially available archive storage systems, Black Pearl 232, cloud used herein as AWS 234, and NAS used herein as a Verde device 236. The Black Pearl archive storage system 232, produced by Spectra Logic Corporation of Boulder, Colo., is a storage system that controls data migration to tape storage 233. Cloud storage, such as AWS (or Amazon Web Service) is a cloud computing service commercially provided by Amazon Corporation of Seattle, Wash. Verde storage is an archive NAS storage system/s 236 server (generally using hard disk drives) produced by Spectra Logic Corporation. As further shown in FIG. 2A, the end-user 101 transfers File A.txt 150 to the NAS system 102 for storage, such as over an Ethernet for example, step 356. Once File A.txt 150 is stored to the NAS system 102, a directory input for File A.txt 150 is added to the NAS system directory for the end-user 101 (some NAS system directories are not specific to a single end-user). The migration policies 380 for File A.txt 150 set up and maintained by the PSCS database 106 are for files maintained in Bucket-001, as shown in FIG. 3.

Figure 3:
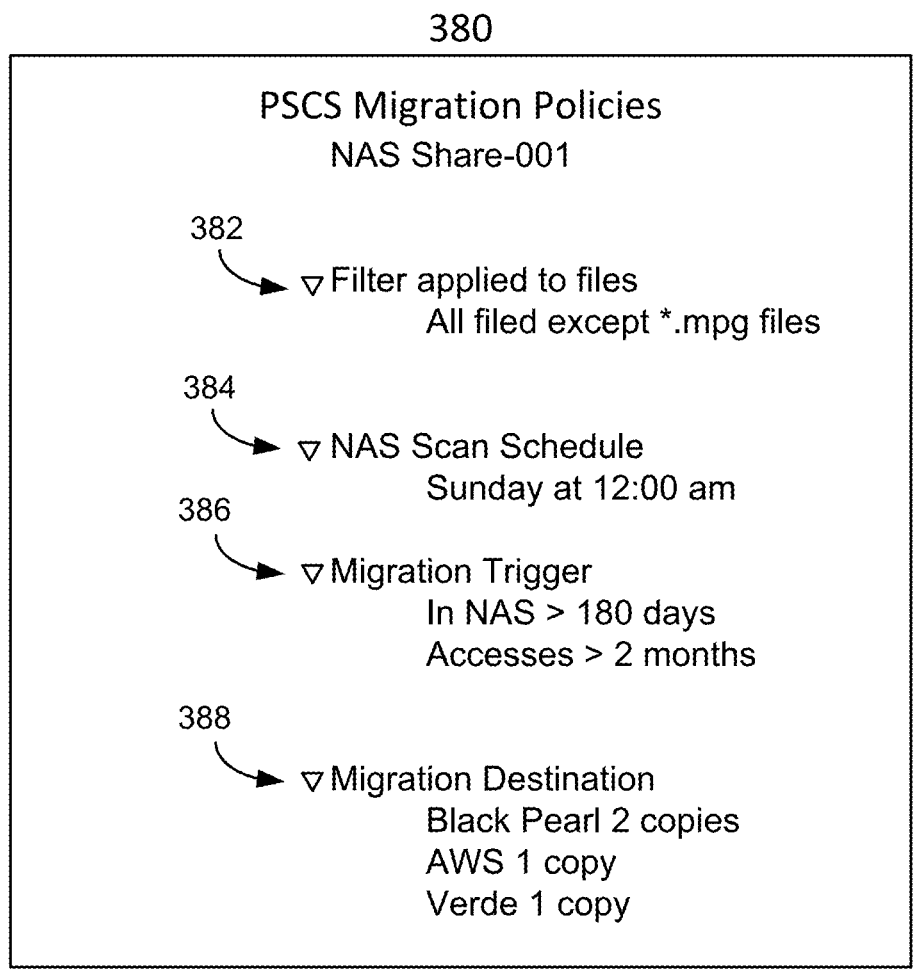
FIG. 3 depicts a block diagram of migration policies for files or data objects consistent with embodiments of the present invention.

FIG. 3 depicts migration policies 380 for files or data objects retained in NAS store 001, which in the present embodiment, refers to a select group of files in a particular folder, for example. Policies do not need to be set up in terms of "stores" and can be grouped in any number of ways. In the present embodiment, the PSCS migration policy 380 has a drop-down tab for file inclusion or file exclusion 382, NAS scanning schedule 384, migration trigger 386, and migration destination 388. More specifically, with respect to the inclusion/exclusion tab 382, the filter is set for exclusion files, meaning files that are candidates for migration in Bucket-001 are those that are not *.mpg files. Accordingly, the present example includes *.txt files for the end-user 101 that are subject to migration. The NAS scan schedule 384 refers to how frequently the NAS system 102 is scanned by PSCS 104 to ascertain what files or data objects are local to the NAS system 102, step 360. In this particular case, the NAS system 102 is scanned once a week on Sundays at 12:00 am. At this point, File A.txt 150 is discovered by PSCS 104 and metadata/information about File A.txt 150 is stored to PSCS database 106, step 362. The migration trigger 386 is set for File A.txt 150 migrated after 180 days, but not before being accessed for at least two months. Finally, PSCS migration policy provides for the migration destination of non-mpg files and copies that meet the migration trigger 386.

Figure 2B:
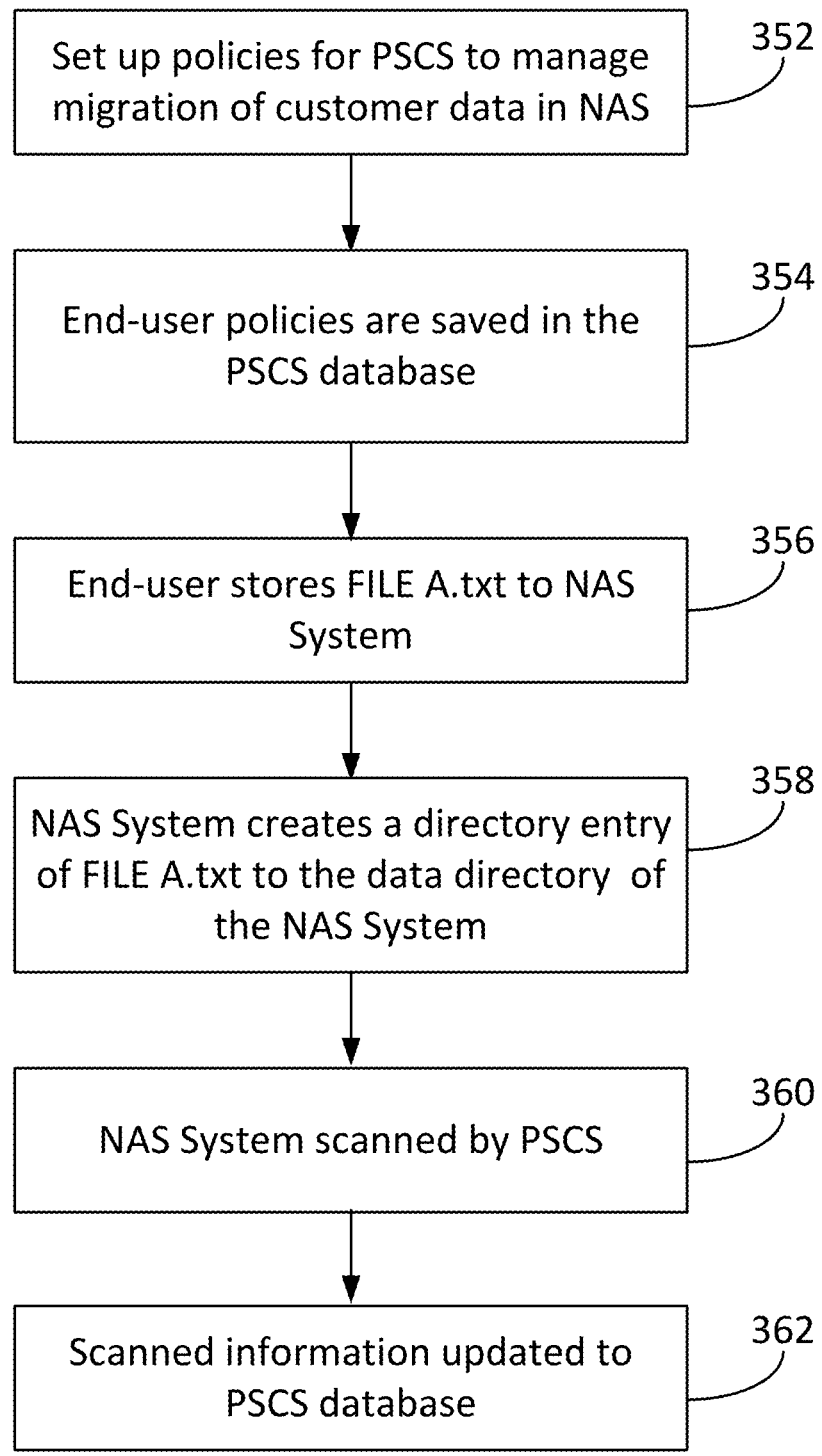
FIG. 2B diagrammatically shows a block diagram of a method steps describing functions of FIG. 2A consistent with embodiments of the present invention.
Figure 4A:
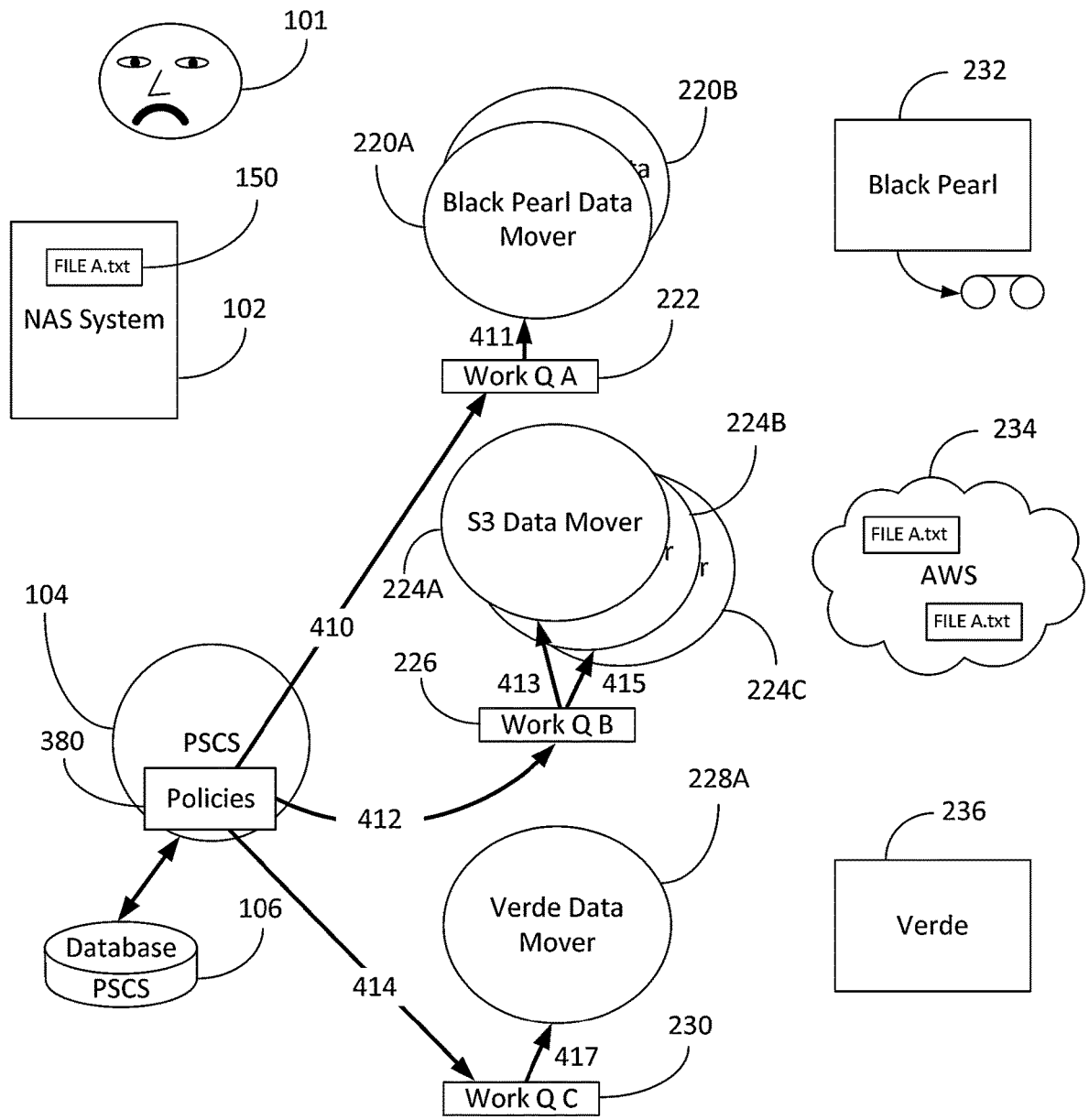
FIG. 4A depicts a block diagram of the network arrangement of FIG. 2A with arrows indicating workflow paths described in view of FIG. 4B, consistent with embodiments of the present invention.
Figure 4B:
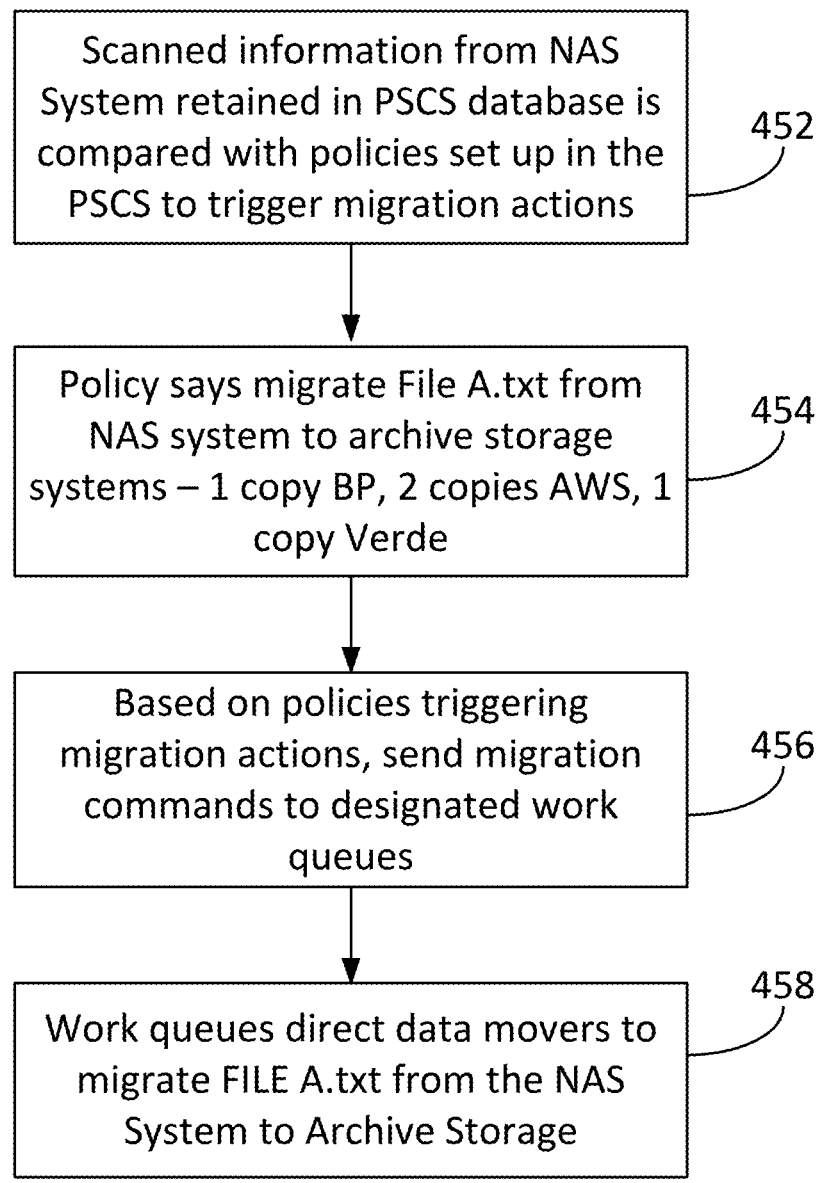
FIG. 4B diagrammatically shows a block diagram of method steps describing functions of FIG. 4A consistent with embodiments of the present invention.

FIG. 4A depicts the network arrangement of FIG. 2A with arrows indicating workflow paths described in view of FIG. 4B, consistent with the example described in FIG. 2B. As shown by the two-way arrow between the PSCS 104 and the PSCS database 106, the scanned information from NAS system 102 retained in PSCS database 106 is compared with policies previously set up in the PSCS 104. Migration actions for files retained in the NAS system 102 are triggered by the policies in PSCS 104, step 452.

Continuing on with the present example, referring back to migration policies 380, all files except *.mpg files are subject to migration if: a) local to NAS system 102 for more than 180 days and b) have not been accessed for at least 2 months. Assuming that File A.txt 150 has not been accessed for at least 2 months and has been in the NAS system 102 for more than 180 days, the migration protocol is initiated. Based on the migration policies 380, PSCS 104 transmits migration instructions to Work Queue A 222, Work Queue B 226 and Work Queue A 222, step 456. More specifically, move File A.txt 150 from NAS system 102 and store one copy to Black Pearl archive storage system 232 (see arrow 410) via Work Queue A 222, move File A.txt 150 from NAS system 102 and store two copies to cloud archive storage system 234 (see arrow 412) Work Queue B 226, and move one copy of File A.txt 150 from NAS system 102 to Verde archive storage system 236 (see arrow 414) Work Queue C 230. The Work Queues in turn queue/buffer the migration instructions from PSCS 104 until the data movers are available to move the designated file/s from NAS system 102 to the targeted archive storage systems, step 458. More specifically, Work Queue A 222 relays the migration instructions to the Black Pearl data mover 220A to move FileA.txt 150 from the NAS 102 to the Black Pearl archive storage system 232 (see arrow 411) when the Black Pearl data mover 220A is available (i.e., the Black Pearl data mover 220A has completed all other moving tasks and is available to take on a new moving task). Work Queue B 226 directs two S3 data movers 224A and 224B to move FileA.txt 150 from the NAS 102 to the AWS archive storage system 234 (see arrows 413 and 415) when each of the S3 data movers 222A and 224B. The two S3 data movers 224A and 224B can store in parallel to AWS 234; that is, a first copy of File A.txt 150 is migrating to AWS 234 while a second copy is also migrating. Work Queue C 230 directs the Verde data mover 228A to move FileA.txt 150 from the NAS 102 to the Verde archive storage system 236 (see arrow 417) when the Verde data mover 228A is available.

Figure 5A:
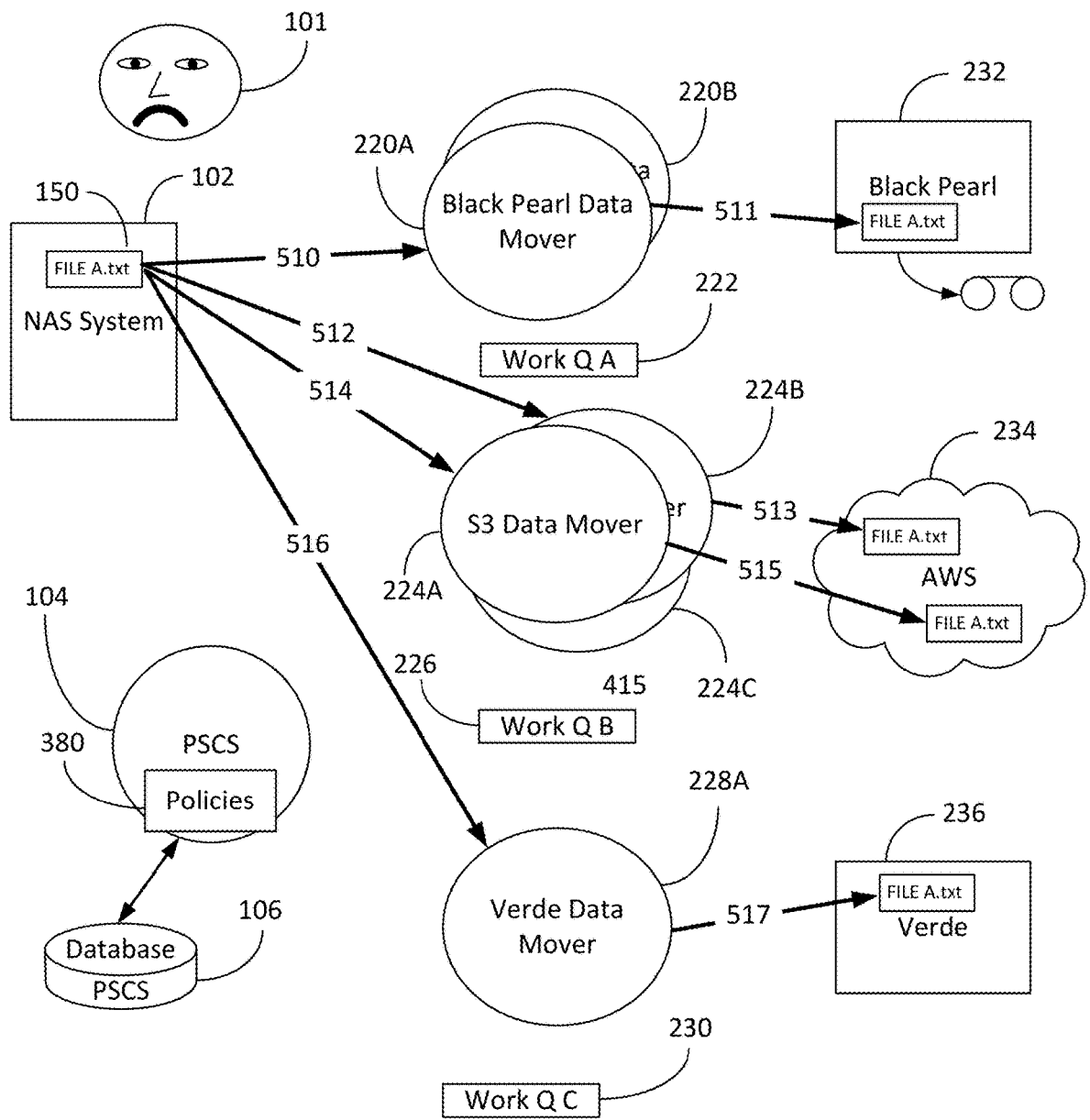
FIG. 5A depicts a block diagram of a continued example of network arrangement of FIG. 4A with arrows indicating workflow paths described in view of FIG. 5B consistent with embodiments of the present invention.
Figure 5B:
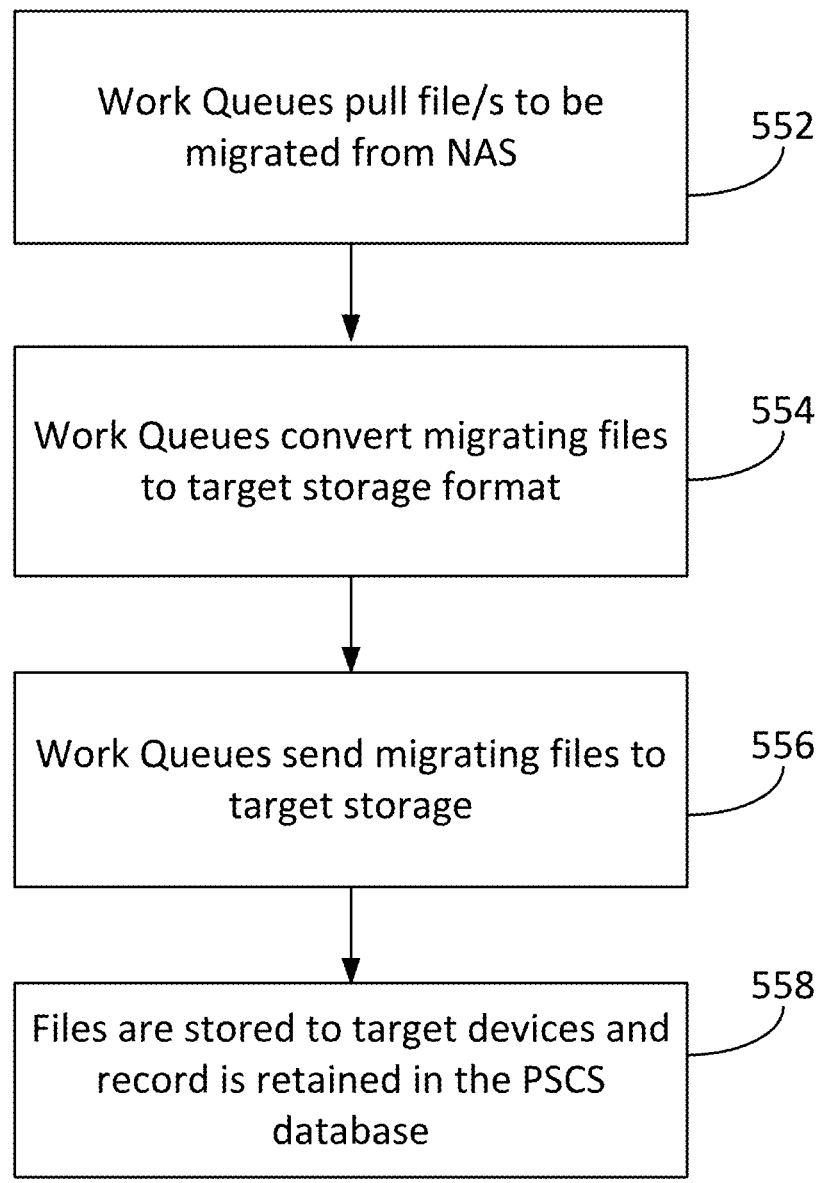
FIG. 5B diagrammatically shows a block diagram of method steps describing functions of FIG. 5A consistent with embodiments of the present invention.

FIG. 5A depicts a continued example of network arrangement of FIG. 4A with arrows indicating workflow paths described in FIG. 5B. The work queues pull files to be migrated from the NAS 102, step 552, and convert the files to the target format, step 554, before migrating the files to the target storage, step 556, and storing them to the target storage, step 558. More specifically, File A.txt 150 is migrated from NAS 102 to Black Pearl 232 via network pathways indicated by arrows 510 and 511. As previously mentioned, certain embodiments envision a data mover as a software module that translates the NAS protocol/format to a target protocol/format. In this case, the Black Pearl data mover 220A knows how to read File A.txt 232 file from NAS 102 and how to write File A.txt 232 to Black Pearl 232. The Black Pearl data mover 220A can run on an independent computing system or can operate within the Black Pearl archive system 232, but is envisioned in the present embodiment not to reside on the NAS system 102. Because two copies of File A.txt 232 are being moved to AWS, two S3 data movers 224A and 224B are provided to accomplish the task in parallel. As shown, a first copy of File A.txt 232 is sent to AWS 234 from NAS system 102 via pathway 512 and 513, and a second copy of File A.txt 232 is sent to AWS 234 from NAS system 102 via pathway 514 and 515. Likewise, a copy of File A.txt 232 is sent to Verde archive storage 236 by way of the Verde data mover 228A via pathway 516 and 517. Hence, as arranged by the policies 380 set up in PSCS 104, one File A.txt 232 copy is stored to the Black Pearl archive storage system 232, two copies of is a File A.txt 232 are stored to AWS 234, and one copy of File A.txt 232 is stored to the Verde archive storage system 236.

Figure 6A:
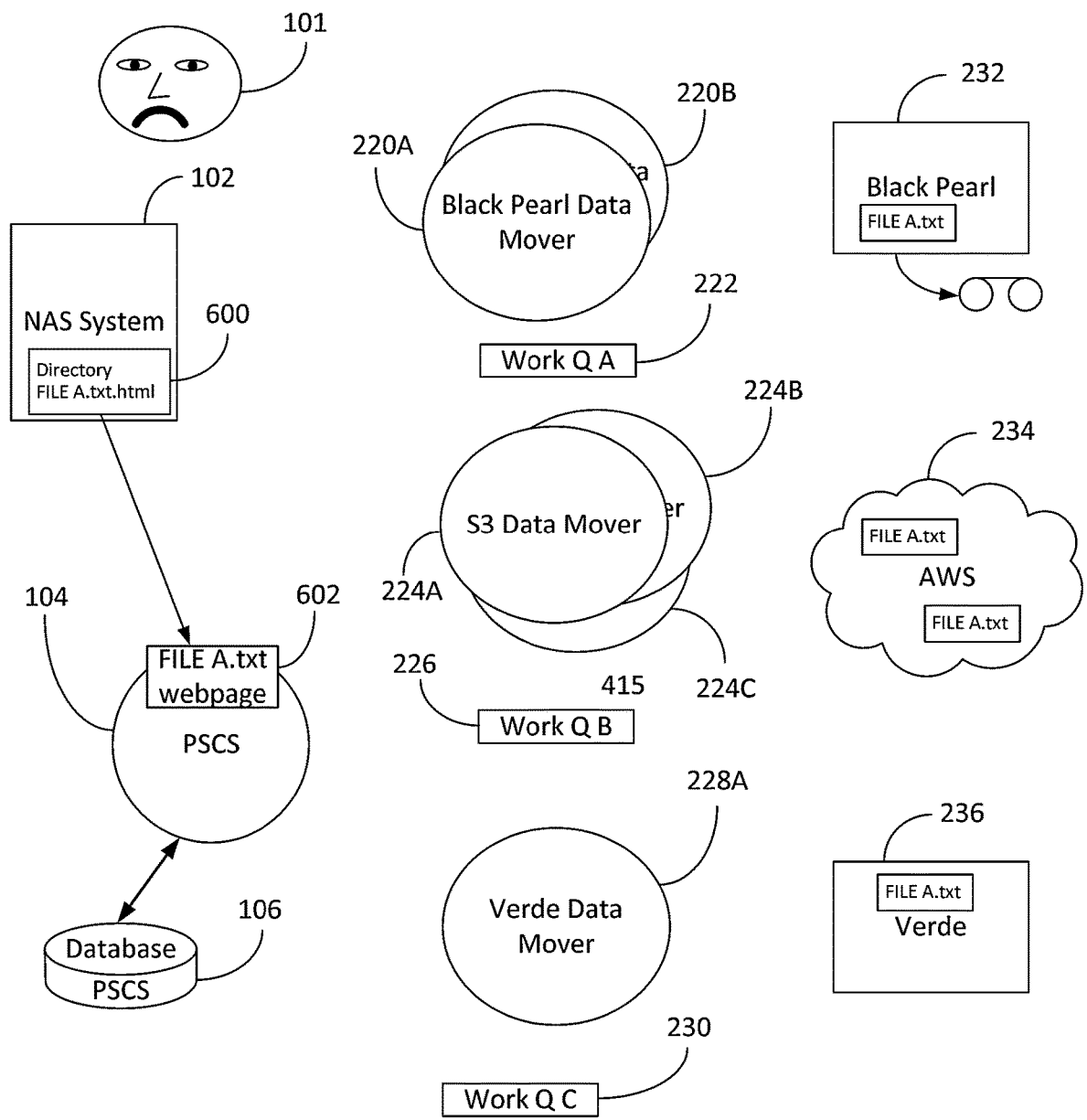
FIG. 6A depicts a block diagram of replacing the directory and NAS system to deal with file migration to archive consistent with embodiments of the present invention.
Figure 6B:
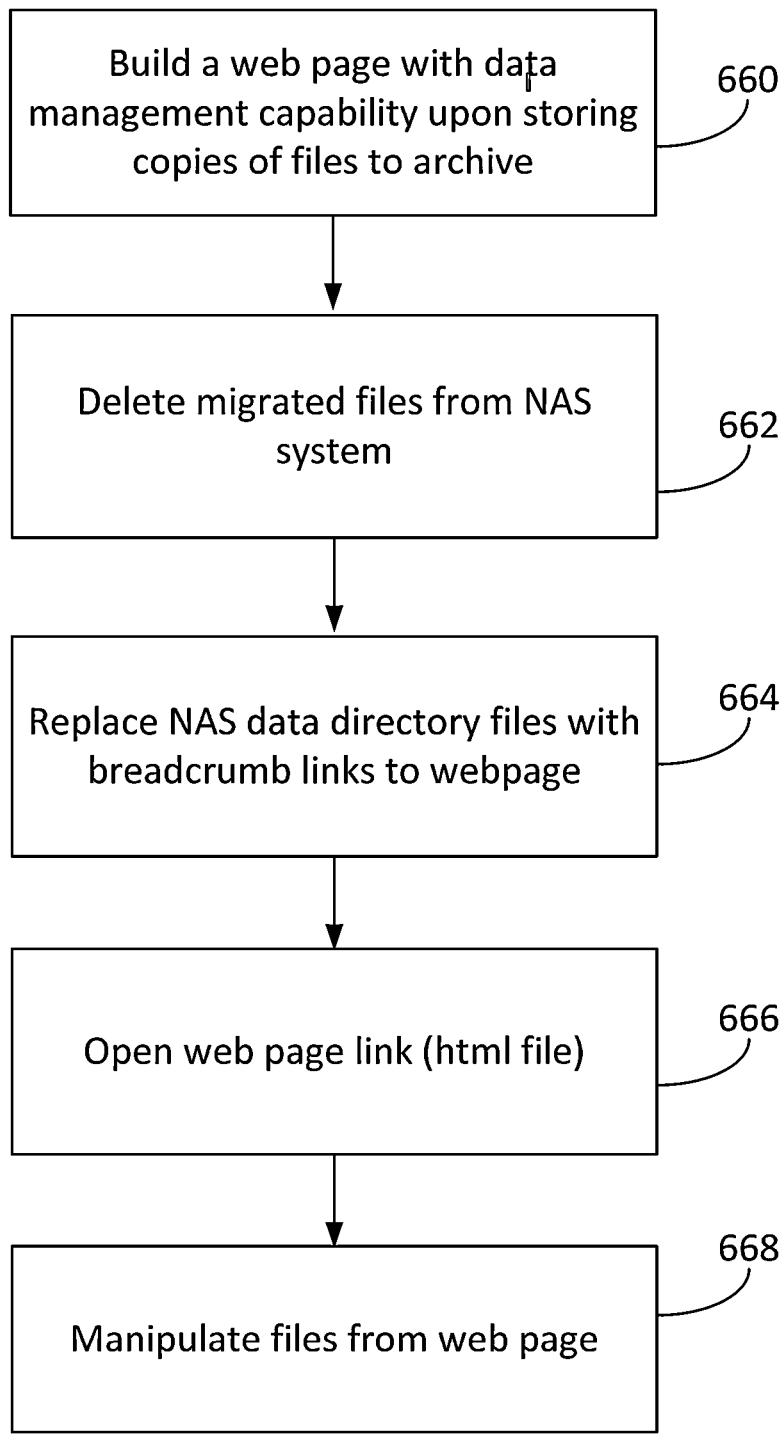
FIG. 6B diagrammatically shows a block diagram of method steps describing functions of FIG. 6A consistent with embodiments of the present invention.

FIG. 6A in view of FIG. 6B depicts and describes replacing the directory and NAS system 102 to deal with file migration to archive consistent with embodiments of the present invention. A webpage 602 is constructed with data management capabilities for the file/s copied to archive. Certain embodiments envision the webpage 602 being built after successful migration while other embodiments contemplate the webpage 602 being constructed before or even during file migration, step 660. As reflected in step 662, the target file, or files, that was successfully migrated (i.e., stored to archive) is deleted from NAS system 102. The data directory entry for the targeted file is replaced with a breadcrumb entry that points to a webpage 602 maintained by PSCS 104, step 664. The webpage 602 displays the data directory for the migrated file and means to access the migrated file. Certain embodiments contemplate the webpage 602 is the only way of accessing the migrated files. The webpage 602 is retained in the PSCS database 106. Should an end-user 101 wish to manipulate or access File A.txt 150, the end-user 101 will simply open the webpage link from the NAS system 102, step 666, and manipulate File A.txt 150 retained in archive from the webpage 602, step 668.

Figure 7A:
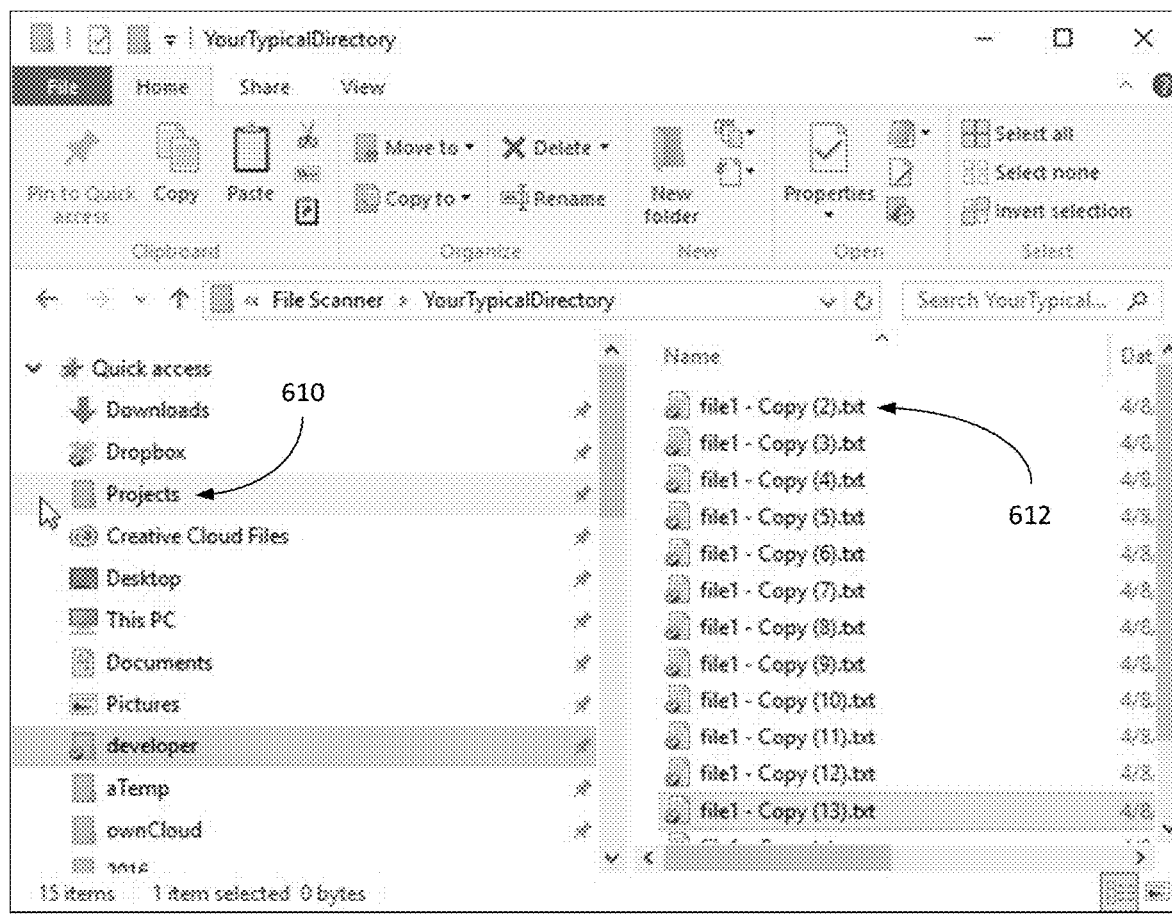
FIGS. 7A and 7B depict schematic diagrams of examples of a before archive directory and an after archive directory consistent with embodiments of the present invention.
Figure 7B:
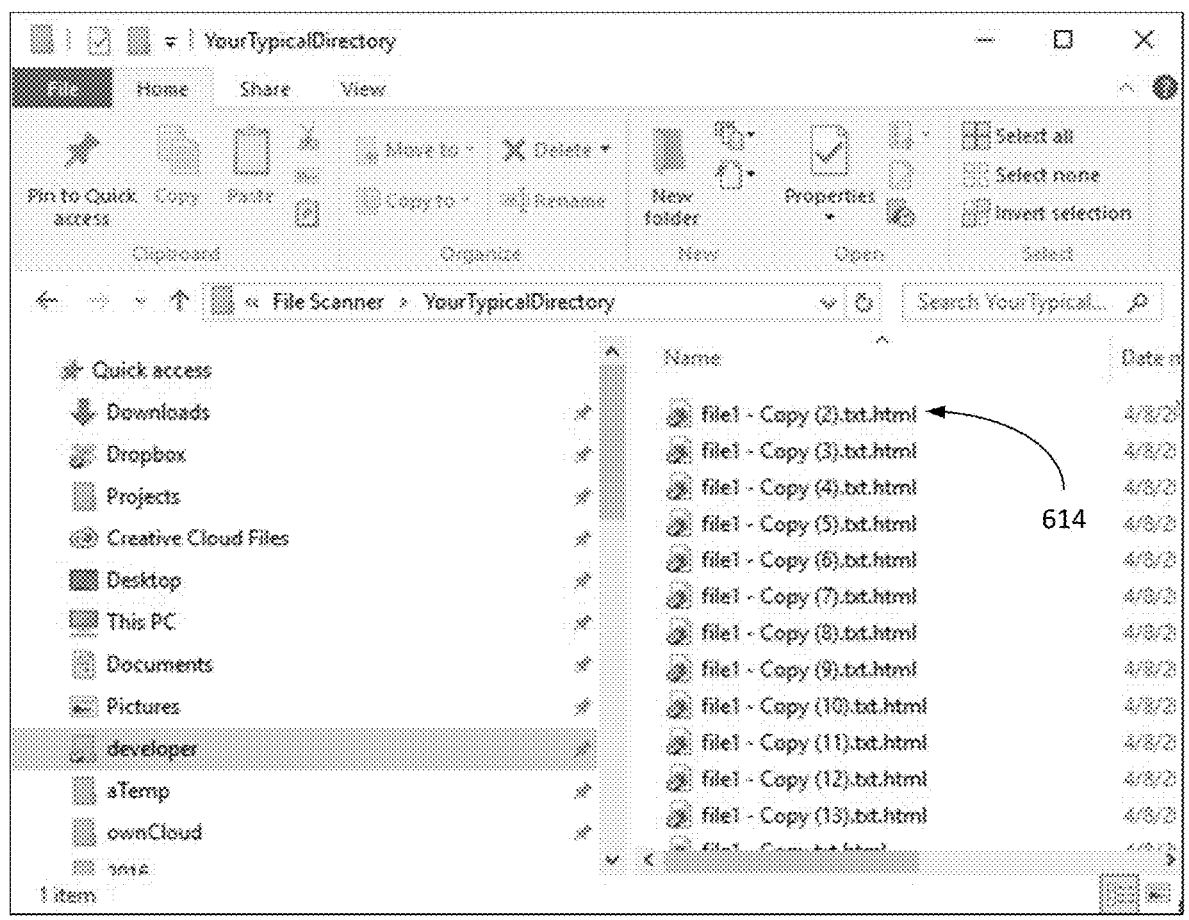

With reference to the ongoing example, File A.txt 150 is deleted from NAS system 102 following a successful migration to Black Pearl 232, AWS 234 and Verde 236. The directory entry for File A.txt 150 is replaced with a new directory entry File A.txt.html 600, which points to a webpage 602 in PSCS 104. FIGS. 7A and 7B depict an example of a before archive directory 604 and an after archive directory 606 consistent with embodiments of the present invention. As shown in FIG. 7A, the before archive directory 604 shows that in the projects folder 610 there are a plurality of data entries to "file 1", namely copies 2 through 13 with specific attention to file1-Copy (2).txt 612. After the files have been migrated and the files are actually deleted from the original folder (i.e., from the original storage device) and a breadcrumb to a webpage for each file copy replaces the directory link as shown in the after archive directory 606, FIG. 7B. Specifically, file1-Copy (2).txt 612 is changed to file1-Copy (2).txt.html 614.

Figure 8:
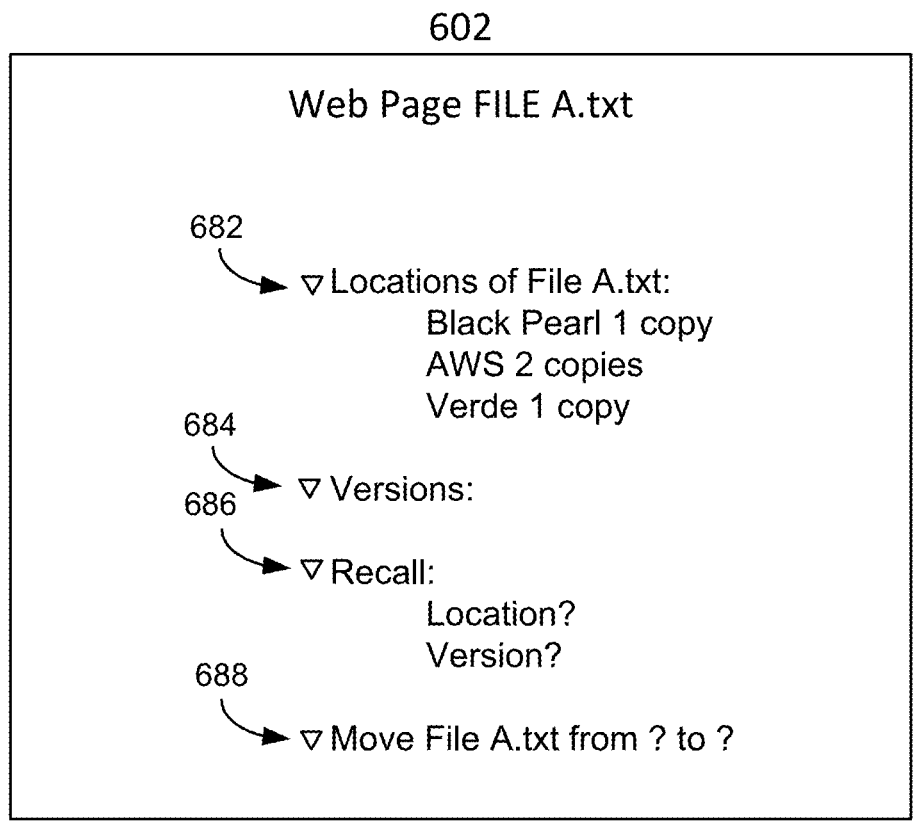
FIG. 8 depicts a schematic diagram of an example of options to manage data from a PSCS webpage in accordance with certain embodiments of the present invention.

FIG. 8A depicts an example of options to manage data from a PSCS webpage 602 in accordance with certain embodiments of the present invention. Though the following example is directed to a webpage for a single file, a webpage for a family of files, bucket of objects/files or one or more folders is imagined and optional embodiments. As shown, the webpage 602 can display a variety of management options for the one or more files managed by the webpage 602 retained in archive. For example, File A.txt 150 is no longer in NAS system 102, however File A.txt.html 600 is the only related file in the NAS data directory. Opening File A.txt.html 600 from the data directory in the NAS system 102 (such as by clicking the left mouse button when the cursor is hovering over File A.txt.html) provides the end-user 101 options to manage File A.txt 150 via webpage 602. In the present embodiment, the Locations tab 682 indicate that Black Pearl 232 possesses one copy of File A.txt 150, AWS 234 possesses two copies of File A.txt 150, and Verde 236 possesses one copy of File A.txt 150. The Versions tab 684 has no entries, however certain embodiments envision multiple versions of File A.txt 150 existing and listed under the Versions tab 684. The Recall tab 686 can provide the end-user 101 with the option of restoring File A.txt 150 back on NAS system 102 from the various locations identified. Certain embodiments also provide the Recall tab 686 with the ability to choose a version of File A.txt 150. Lastly, further migration tab 688 provides the option of moving File A.txt 150 from one archive location to another. As will be appreciated by one skilled in the art, a number of other management tabs can certainly exist on the webpage 602 within the scope and spirit of the present invention.

With regards to versioning, certain embodiments contemplate updates (versions) made to a file whether the original file is in NAS system 102 or in archive 114 is stored in NAS system 102 and transferred as a version to the archive storage system 114 under the same web page 602. For example, assume Version-1 of File A.txt resides in Black Pearl archive storage 232 and end user 101 saves Version-2 of File A.txt to NAS storage 102. Based on policies 380 set up for versions of File A.txt, Version-2 of File A.txt is migrated to Black Pearl archive storage 232 and the webpage 602 will display a list of the versions in Black Pearl archive storage 232. Accordingly, end-user 101 can choose which version to recall. In the present example Versions-1 through Version-n can be listed summarily on the webpage for File A.txt 602.

Upon recalling and restoring File A.txt 150 to NAS system 102, certain embodiments envision entering in the NAS directory that File A.txt 150 is local. Other certain embodiments envision retaining the webpage 602 and a link there to in NAS system 102. As with before, the PSCS 104 scans NAS system 102 at a prescribed point in time and updates the PSCS database 106 as required.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a web address is used as a target for entering the storage characterization and migration software platform 104, also known as the PSCS, some other pointer or address could equally be used while still maintaining substantially the same functionality without departing from the scope and spirit of the present invention. Another example can include providing a data mover that is an independent computing system that includes a queue system, or placing the data mover function within the archive storage system that it serves. Yet another example can include the PSCS 104 being loaded on an archive system or being on an independent computing server while staying within the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:
1. A storage arrangement comprising:
   a primary storage system possessing a processor and memory a first data file and a data directory listing that the first data file is on the primary storage system at a first point in time;
   a copy of the first data file located in a first archive location on an archive storage system at a second point in time, at the second point in time the primary storage system not in possession of the first data file;
   a webpage that links to the copy of the first data file, the webpage is independent from the primary storage system; and
   a breadcrumb file that links to the webpage, the data directory listing is replaced by the breadcrumb file at or after the second point in time, the breadcrumb file is linked to the webpage,
   the second point in time is after the first point in time.
2. The storage arrangement of claim 1 further comprising a storage characterization and migration software platform (SCMS) wherein the webpage is managed.

3. The storage arrangement of claim 2 further comprising policies that govern the first data file, the policies reside in an SCMS database for the SCMS.

4. The storage arrangement of claim 3 further comprising updates from the directory listing retained in the SCMS database, the policies configured to scan the directory listing for the updates.

5. The storage arrangement of claim 1 wherein the breadcrumb is located in the primary storage system and wherein the breadcrumb is configured to open the webpage.

6. The storage arrangement of claim 5 further comprising a second copy of the first data file located in the primary storage system at a third point in time, the third point in time after the second point in time.

\* \* \* \* \*